United States Patent [19]

Nishi

[11] Patent Number: 4,474,352
[45] Date of Patent: Oct. 2, 1984

[54] MECHANISM FOR ADJUSTING VERTICAL ANGLE

[75] Inventor: Takayoshi Nishi, Yokohama, Japan
[73] Assignee: Fujitsu Limited, Kawasaki, Japan
[21] Appl. No.: 428,480
[22] Filed: Sep. 29, 1982

[30] Foreign Application Priority Data

Sep. 30, 1981 [JP] Japan .............................. 56-155021

[51] Int. Cl.³ .............................................. A47G 1/24
[52] U.S. Cl. ................................... 248/456; 248/180; 248/183; 292/338
[58] Field of Search ............... 248/456, 454, 457, 180, 248/178, 183, 186, 187, 188.2, 123.1, 162.1, 678, 663, 346, 664, 660, 661; 292/338

[56] References Cited

U.S. PATENT DOCUMENTS

3,940,181 2/1976 Cheek ................................. 292/338
3,991,967 11/1976 Sack ..................................... 248/456
4,196,674 4/1980 Van Laarhoven ................. 248/456
4,349,173 9/1982 Volka et al. ........................ 248/183

Primary Examiner—William H. Schultz
Assistant Examiner—Ramon O. Ramirez
Attorney, Agent, or Firm—Staas & Halsey

[57] ABSTRACT

A vertical angle adjusting mechanism for use in a display device and other devices, including a support on which an object whose vertical angle is to be adjusted is mounted, the support being pivotable upward and downward, the support being provided with an engagement slot formed with a plurality of recesses; a lock element pivotally attached to the object and engaged with the engagement slot in the support; and a slide member attached to the support and engaged with the lock element for selectively exposing or covering the recesses of the engagement slot in the support for engagement, or for preventing engagement, with the lock element according to the direction of the movement of the lock element.

6 Claims, 14 Drawing Figures

MECHANISM FOR ADJUSTING VERTICAL ANGLE

BACKGROUND OF THE INVENTION

The present invention relates to a mechanism for adjusting the vertical angle of a device, such as a display device or keyboard.

In conventional display devices, the vertical angle of the display unit is not adjustable in itself. To change the vertical angle, therefore, it is necessary to mount the display unit on a special support with the desired slope. With this method, however, it is still not possible to adjust the vertical angle, as the occasion demands, to best meet the operator's line of sight.

SUMMARY OF THE INVENTION

It is, therefore, an object of the present invention to provide a vertical angle adjusting mechanism for use with a display device and other devices.

According to the present invention, there is provided a vertical angle adjusting mechanism which comprises: a support on which an object whose vertical angle is to be adjusted is mounted and which is pivotable upward and downward, the support being provided with an engagement slot formed with a plurality of recesses; a lock element pivotally attached to the object and engaged with the engagement slot in the support; and slide means, attached to the support and engaged with the lock element, for exposing the recesses of the engagement slot, for engagement with the lock element when the lock element is moved in the engagement slot in one horizontal direction and for covering the recess to prevent engagement with the lock element when the lock element is moved in the opposite horizontal direction.

The present invention will now be described in detail based on preferred embodiments with reference to the accompanying drawings.

DESCRIPTION OF THE PREFERRED EMBODIMENTS

Referring to FIGS. 1 through 7, reference numeral 1 generally designates a display device. The display device comprises a display unit 2 having a display element 3, such as a cathode-ray tube, a base 4 having legs 5, and a vertical angle adjusting mechanism 6 interposed between the display unit 2 and the base 4.

Figure 3:
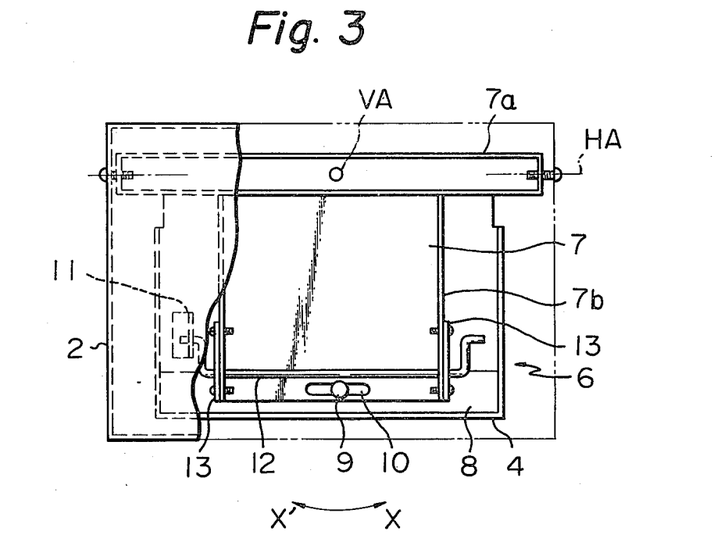
FIG. 3 is a partial cut-away plan view of the first embodiment of the vertical angle adjusting mechanism.
Figure 4:
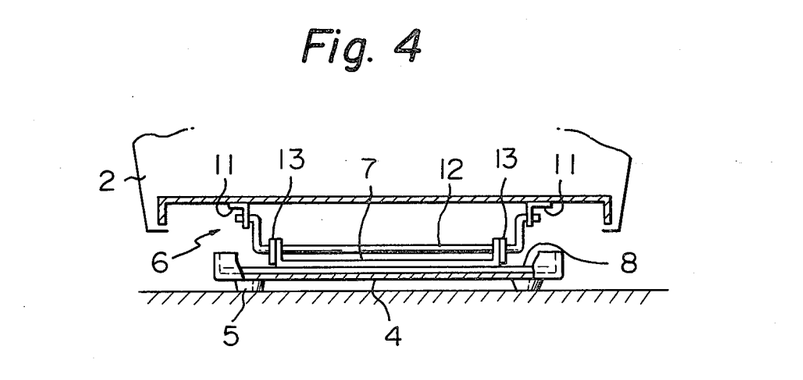
FIG. 4 is a partial cut-away front view of the first embodiment of the vertical angle adjusting mechanism.

The vertical angle adjusting mechanism 6 comprises a support 7 which is composed of two members 7a and 7b (FIG. 3) rigidly connected to each other. The support 7 is mounted on the base 4 and is pivotally movable about the vertical axis VA in the directions of the arrows X and X' (FIG. 3). Reference numeral 8 designates a slip plate for smooth pivotal movement of the support 7, and a screw 9 which is screwed into the base 4 and extends freely through a slot 10 formed in the support 7 so as to restrict the pivotal movement of the support 7.

Figure 1:
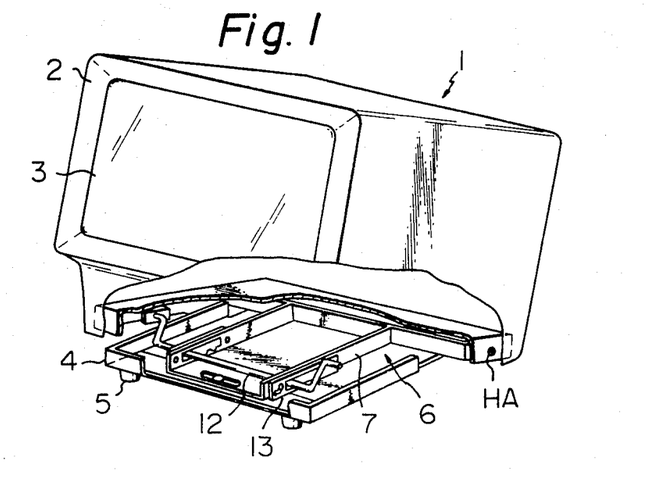
FIG. 1 is a partial cut-away perspective view of a display device with a first embodiment of the vertical angle adjusting mechanism according to the present invention.
Figure 2:
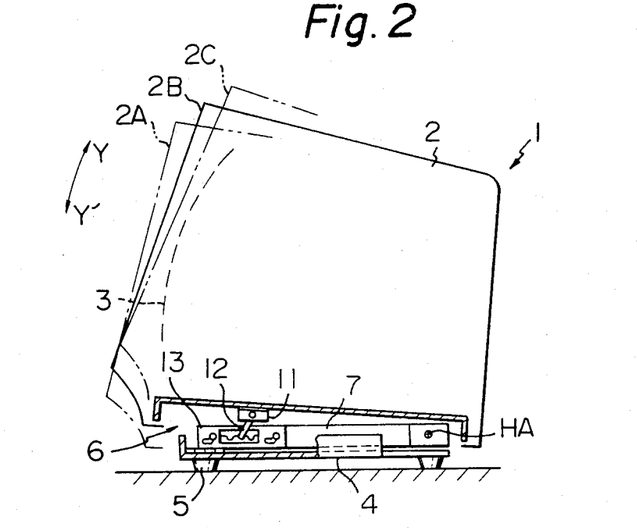
FIG. 2 is a schematic side view of the display device illustrated in FIG. 1.

The display unit 2 is mounted on the support 7 and is pivotally movable about a horizontal axis HA in the directions of the arrows Y and Y' (FIG. 2). The display unit 2 is provided at the bottom thereof with a cranked lock bar 12 which pivots from a pair of brackets 11 fixed to the display unit 2.

Figure 5:
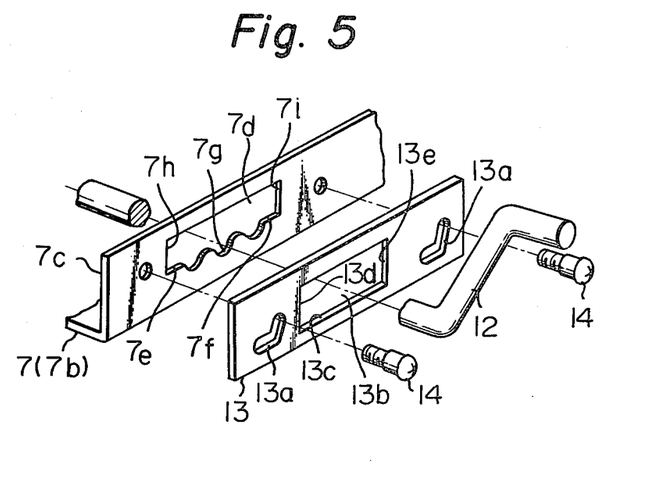
FIG. 5 is a disassembled perspective view of the main portion of the first embodiment of the vertical angle adjusting mechanism.
Figure 6:
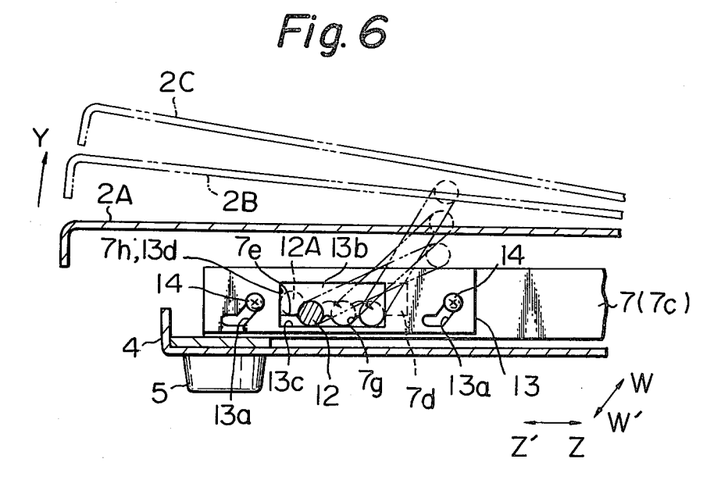
FIGS. 6 and 7 are schematic side views of the main portion of the first embodiment of the vertical angle adjusting mechanism, illustrating the operation thereof.
Figure 7:
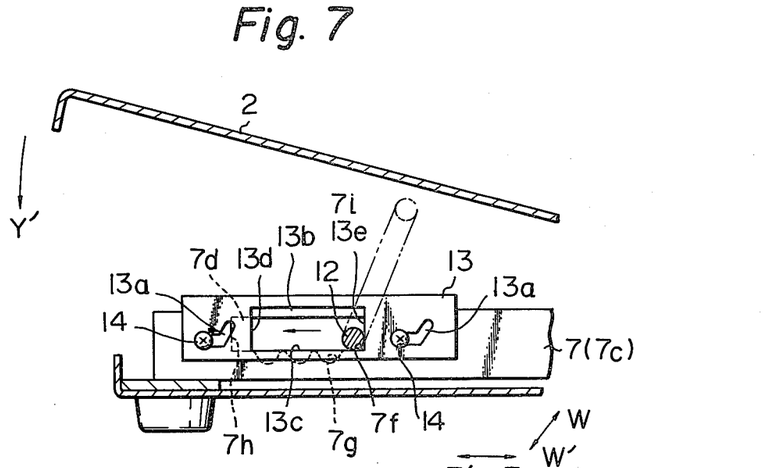
Figure 8:
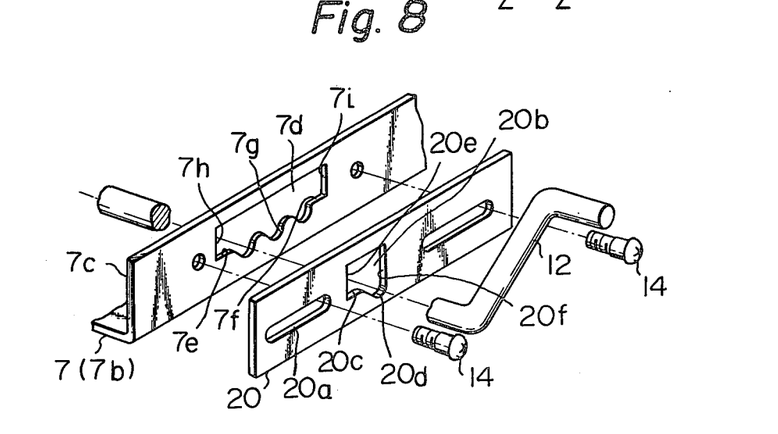
FIG. 8 is a disassembled perspective view of the main portion of a second embodiment of the vertical angle adjusting mechanism according to the present invention.

The member 7b of the support 7 has a pair of flanges 7c. As illustrated in FIGS. 5 through 7, the flange 7c is provided with engagement slot 7d which is formed with two straight portions 7e and 7f at the ends thereof and a plurality (three in this embodiment) of recesses 7g disposed between the straight portions 7e and 7f.

A slide plate 13 is attached to each of the support flanges 7c by two screws 14, which are screwed into the flanges 7c on opposite sides of the slot 7d and extend through guide slots 13a formed in the slide plate 13. The guide slots 13a are crooked in the right upward direction in FIGS. 6 and 7, so that the slide plate 13 can move with respect to the support 7 along the guide slots 13a in the directions of the arrows W, W', Z and Z'. The slide plate 13 is also provided with a rectangular window 13b which substantially corresponds to the engagement slot 7d in the support 7. The lock bar 12 extends through and engages with the slot 7d in the support 7 and the window 13b in the slide plate 13.

The vertical angle adjusting mechanism 6 enables variation of the vertical angle, i.e., the angle in the direction of the arrows Y and Y', of the display unit 2, as illustrated in FIG. 2. The operation of varying the vertical angle of the display unit will now be described with reference to FIGS. 6 and 7.

First, assume that the display unit 2 is initially set in the lowermost position in the direction Y'. In this setting, the lock bar 12 lies at position 12A in FIG. 6, i.e., on the straight portion 7e of the slot 7d on the front side (i.e., on the left side in FIGS. 6 and 7) and abuts against the front end 7h of the slot 7d, thereby locking the display unit 2 in that position. The slide plate 13 is also held in the lowermost position, where the front end 7h of the slot 7d is aligned with the front end 13d of the window and the lower side 13c of the window 13b in the slide plate 13 is positioned below the recesses 7g of the slot 7d, as illustrated in FIG. 6. In this position, the recesses 7g are exposed for engagement with the lock bar 12.

To adjust the vertical angle of the display unit 2 in the direction Y, the operator pivots the display unit 2 upward from its initial position. This movement of the display unit 2 moves the lock bar 12 from the position 12A in the direction Z for successive engagement with the recesses 7g of the slots 7d. The operator stops pivoting the display unit 2 upward when the optimum angle is reached, and then releases the unit. The weight of the display unit 2 then causes the lock bar 12 to engage with the last recess 7g it entered before the operator stopped pivoting the display unit 2 upward. Accordingly, the display unit 2 is held at the optimum angle. In FIGS. 2 and 6, reference numerals 2A, 2B, and 2C designate the positions of the display unit 2 when the lock bar 12 is in engagement with the three recesses 7g.

To further adjust the vertical angle of the display unit 2 in the direction Y, the operator need only further pivot the display unit 2 upward. The lock bar 12 then engages the recess 7g disposed to the right (in FIG. 6) of the previously engaged recess.

To return vertical angle of the display unit 2 in the direction Y', the operator first pivots the display unit 2 upward to the uppermost position in the direction Y, causing the lock bar 12 to ride on the rear straight portion 7f of the slot 7d and abut against the rear end 7i of the slot 7d, as illustrated in FIG. 7. This causes the lock bar 12 to abut against the rear end 13e of the window 13b in the slide plate 13 and move the slide plate 13 along the guide slots 14, first in the direction W and then in the direction Z. The lower side 13c of the window 13b in the slide plate 13 is then positioned above the recesses 7g of the slot 7d in the support 7, covering the recesses 7g and preventing engagement with the lock bar 12. Next, the operator reduces the force applied to the display unit 2 in the direction Y, allowing the display unit 2 to pivot downward due to the its own weight in the direction Y'. The lock bar 12 thus slides on the lower side 13c of the window 13b in the slide plate 13 in the direction Z' without engaging the recesses 7g. When the lock bar 12 abuts against the front end 13d of the window 13b in the slide plate 13, it moves the slide plate 13 along the guide slots 14, first in the direction Z' and then in the direction W'. Thereafter, the lock bar 12 abuts against the front end 7h of the slot 7d in the support 7, whereby further pivotal movement of the display unit 2 in the direction Y' is prevented. This restores the display unit 2, the lock bar 12, and the slide plate 13 to their initial positions as described above with reference to FIG. 6. Consequently, the operator can perform the same operation as described above with reference to FIG. 6 to set the display unit 2 at the desired angle.

It should be noted that the lower side 13c of the window 13b in the slide plate 13 and the lock bar 12 are processed so that they to have very smooth surfaces. Therefore, since the friction between the lock bar 12 and the lower side 13c is small, there is no possibility of the lock bar 12, when sliding on the lower edge 13c in the direction Z', accidentally moving the slide plate 13 to uncover the recesses 7g and cause engagement of the lock bar 12.

In the embodiment described above, the slide plate 13 is constructed to move up and down and cover and expose the recesses 7g of the engagement slot 7d. However, various other constructions of the slide plate are available, as described below.

FIGS. 8 through 11 illustrate a second embodiment of the present invention, in which the same parts as in the first embodiment described hereinbefore are designated by the same reference numerals. The second embodiment is generally similar to the first embodiment, except that the support 7 is provided at each flange 7c with a slide plate 20 different from the slide plate 13 in the first embodiment. The slide plate 20 is provided with two straight guide slots 20a, which engage screws 14 to permit the slide plate 20 to move in the horizontal directions Z and Z'. The slide plate 20 is also provided with a window 20b, which is formed with a recess 20d having the same shape as that of the recess 7g of the support 7 and a lower straight portion 20c adapted for covering the recess 7g of the support 7.

The operation of the second embodiment will now be described with reference to FIGS. 9 through 11. First, assume that the display unit 2 and the lock bar 12 are initially set in the same positions as in the first embodiment. In this setting, the slide plate 20 is held in the foremost position in which the straight portion 20c, the recess 20d, and the front end 20e of the window 20b in the slide plate 20 are aligned with the straight portion 7e, the recess 7g, and the front end 7h of the slot 7d in the support 7, respectively, as illustrated in FIG. 9.

Figure 9:
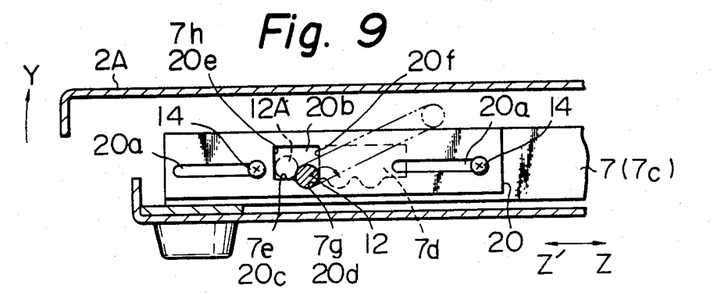
FIGS. 9, 10 and 11 are schematic side views of the main portion of the second embodiment of the vertical angle adjusting mechanism, illustrating the operation thereof.
Figure 10:
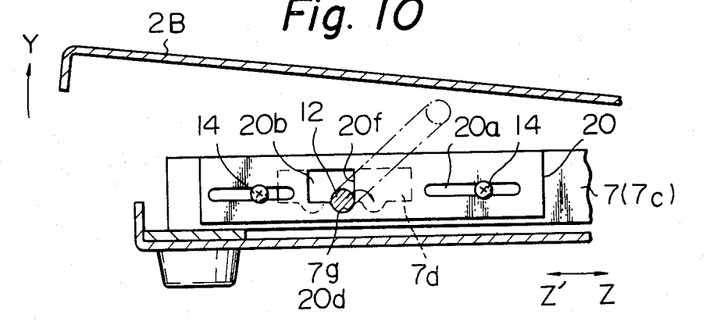

When the operator pivots the display unit 2 upward from its initial position in the direction Y, the lock bar 12 moves from its initial position 12A in the direction Z to first engage with the aligned recesses 7g and 20d, as illustrated in FIG. 9. The lock bar 12 then abuts against the rear end 20f of the window 20b and moves the slide plate 20 in the direction Z, so that the recess 20d of the window 20b is successively aligned with the recesses 7d of the slot 7d, thereby allowing the lock bar 12 to successively engage with the aligned recesses 7g and 20d, as illustrated in FIG. 10. Accordingly, when the lock bar 12 and the recess 20d of the window 20b are aligned with the recess 7g of the slot 7d which corresponds to the desirable vertical angle of the display unit 2, the operator can engage the lock bar 12 with the aligned recesses 7g and 20d to set the display unit 2 at the desirable angle.

To further adjust the vertical angle of the display unit 2 in the direction Y, the operator need only further pivot the display unit 2 upward. The lock bar 12 and the recess 20d of the window 20b are then aligned with the recess 7g disposed to the right (in FIGS. 9 and 10) of the previously engaged recess and, then, the lock bar 12 engages the newly aligned recesses 7g and 20d.

Figure 11:
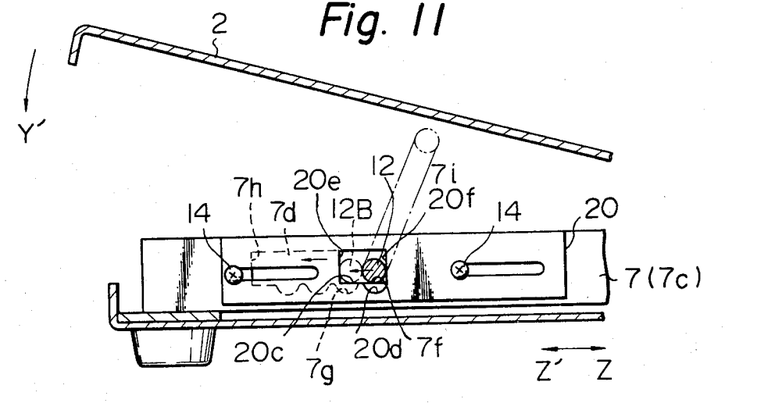

To return the vertical angle of the display unit 2 in the direction Y', the operator first pivots the display unit 2 upward to the uppermost position in the direction Y, causing the lock bar 12 to ride on the rear straight portion 7f of the slot 7d in the support 7, as illustrated in FIG. 11. The slide plate 20 is then moved by the lock bar 12 into the position in which the recess 20d of the window 20b is covered with the straight portion 7f of the slot 7d and the recess 7g of the slot 7d is covered with the straight portion 20c of the window 20b. Next, the operator reduces the force applied to the display unit 2 in the direction Y, allowing the display unit 2 to pivot downward, due to its own weight in the direction Y'. The lock bar 12 thus slides on the straight portion 7f of the slot 7d in the direction Z' and moves onto the straight portion 20c of the window 20b, as indicated by reference numeral 12B in FIG. 11. Thereafter, the lock bar 12 abuts against the front end 20e of the window 20b and moves the slide plate 20 in the direction Z'. The slide plate 20, with the lock bar 12 riding on the straight portion 20c thereof, is moved in the direction Z', until the lock bar 12 abuts against the front end 7h of the slot 7d. During this movement, the lock back 12 does not engage with the recesses 7g in the slot 7d, because the recesses 7g are covered by the straight portion 20c of the window 20b. When the lock bar 20 abuts against the front end 7h of the slot 7d, further pivotal movement of the display unit 2 in the direction Y' is prevented. This restores the display unit 2, the lock bar 12, and the slide plate 13 to their initial positions as described above with reference to FIG. 9. Consequently, the operator can perform the same operation as described above with reference to FIGS. 9 and 11, to set the display unit 2 at a desirable angle.

Figure 12:
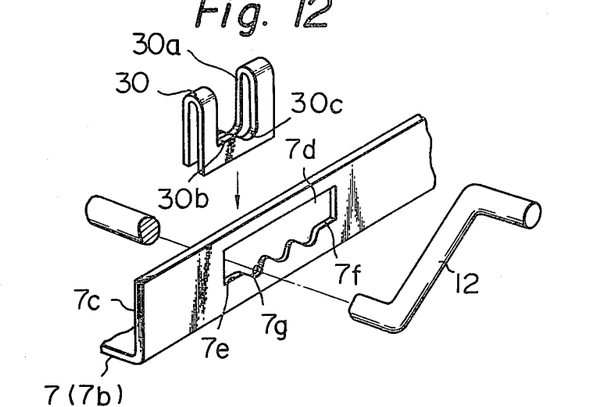
FIGS. 12 and 13 illustrate a modification of the second embodiment.
Figure 13:
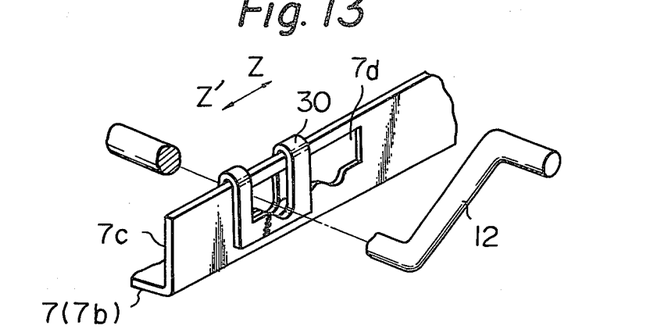

FIGS. 12 and 13 illustrate a modification of the second embodiment described above, in which the support 7 is provided at each flange 7c with a slide member 30 different from the slide plates 20 in the second embodiment. The slide member 30 is formed by bending a plate into a U-shape and is mounted on the support 7 straddling the flange 7C. The slide member 30 is provided with a window 30a which is formed with a pair of straight portions 30b and a pair of recesses 30c, which are substantially the same as the straight portion 20c and the recesses 20d in the slide plate 20 in the second embodiment, respectively. Since the lock bar 12 extends through the slot 7d in the support 7 and the window 30a in the slide member 30, the slide member 30 is prevented from slipping off the flange 7c without the use of a particular retaining means. The operation of adjusting the vertical angle of the display unit in this modification can be performed in the same manner as in the second embodiment.

In the second embodiment or the modification thereof described hereinbefore, when returning the display unit 2 from the previously set position in the direction Y', it is necessary to first pivot the display unit 2 upward to the uppermost position in the direction Y. This step can be eliminated by the modification schematically illustrated in FIG. 14.

Figure 14:
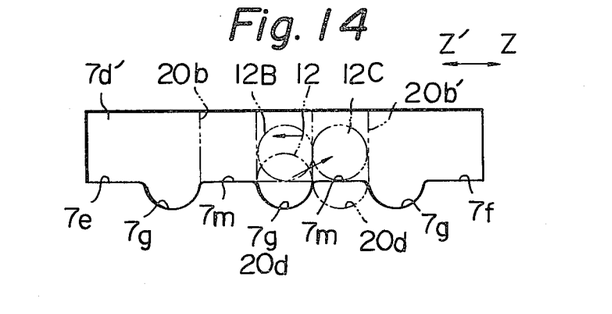
FIG. 14 schematically illustrates another modification of the second embodiment.

In FIG. 14, reference numeral 7d' designates an engagement slot formed in the support 7, and 12 and 20b designate the lock bar and the window in the slide plate 20, respectively, which are the same as in the second embodiment. The slot 7d' is different from the slot 7d in the second embodiment in that it has intermediate straight portions 7m interposed between adjacent recesses 7g, each portion having a length substantially equal to the diameter of the lock bar 12.

According to this modification, the operation of returning the lock bar 12 in the direction Z' is performed in the manner described below. Assume that the lock bar 12 is engaged with the central recess 7g of the slot 7d'. When the operator pivots the display unit 2 upward in the direction Y, the lock bar 12 is moved in the direction Z and rides on the intermediate straight portion 7m, as indicated by reference numeral 12C. On the other hand, since the slide plate 20 is moved by the lock bar 12, the window 20b is moved into the position 20b' in which the recess 20d of the window 20b is covered with the intermediate straight portion 7m of the slot 7d' and the recess 7g of the slot 7d' is covered with the straight portion 20c of the window 20b. In this situation, when the display unit 2 pivots in the direction Y', the lock bar 12 moves onto the straight portion of the window 20b, without engaging with the recesses 20d and 7g, as indicated by reference numeral 12B. As a result, the lock bar 12 can return from the position 12C in the direction Z'. Therefore, it is unnecessary to pivot the display unit 2 upward to the uppermost position in the direction Y to move the lock bar 12 to the position on the rear straight portion 7f of the slot 7d', as in the second embodiment, resulting in a simple operation.

As described above, the vertical angle adjusting mechanism according to the present invention provides easy adjustment of the vertical angle of the display unit 2 to meet the operator's line of sight at any occasion.

It should be noted that, in the embodiments described herein, the display unit 2 can be pivoted together with the support 7 in the horizontal direction about the vertical axis AH.

Moreover, in the embodiments described herein, the support 7 is provided with two slide plates. However, if the lock bar has a high torsional rigidity, only one slide plate is required.

I claim:

1. A mechanism for adjusting a vertical angle, comprising:
    a support on which an object whose vertical angle is to be adjusted is mounted, said support being pivotable upward and downward, the support also being provided with an engagement slot formed with a plurality of recesses;
    a lock element pivotally attached to said object and engaged with said engagement slot in the support; and
    slide means, attached to said support and engaged with said lock element, for exposing said recesses of the engagement slot for engagement with said lock element when the lock element is moved along the engagement slot in a first horizontal direction and covering said recesses in order to prevent engagement of said lock element when the lock element is moved in the opposite horizontal direction.

2. A mechanism according to claim 1, wherein said slide means comprises:
    a slide plate provided with a rectangular window substantially corresponding to said engagement slot in the support, for engagement with said lock element, and guide slots disposed on the opposite sides of said window, said guide slots being crooked upward in said first horizontal direction; and
    elements extending through said guide slots in the slide plate and fixed to said support for securing the slide plate to the support.

3. A mechanism according to claim 1, wherein said slide means comprises:
    a slide plate provided with a window for engagement with said lock element, the window being formed with a recess corresponding to any one of the recesses of the engagement slot in the support and a straight portion for covering any one of the recesses of the engagement slot, and straight guide slots disposed on the opposite sides of said window, said guide slots extending in the horizontal direction; and
    elements extending through said guide slots in the slide plate and fixed to said support for securing the slide plate to the support.

4. A mechanism according to claim 1, wherein said slide means comprises a slide member provided with a window for engagement with said lock element, the window being formed with a recess corresponding to any of one the recesses of the engagement slot in the support and a straight portion adapted for covering any one of the recesses of the engagement slot, said slide member being formed in a U-shape and mounted straddling the support.

5. A mechanism according to claim 3, wherein said engagement slot of the support is further formed with intermediate straight portions disposed between the adjacent recesses, each intermediate straight portion having a length substantially equal to that of any one of the recesses.

6. A mechanism according to claim 4, wherein said engagement slot of the support is further formed with intermediate straight portions disposed between the adjacent recesses, each intermediate straight portion having a length substantially equal to that of one of said recesses.

* * * * *

UNITED STATES PATENT AND TRADEMARK OFFICE
CERTIFICATE OF CORRECTION

PATENT NO. : 4,474,352

DATED : October 2, 1984

INVENTOR(S) : Nishi

It is certified that error appears in the above-identified patent and that said Letters Patent is hereby corrected as shown below:

Front page, Col. 2, line 3, "Ramirez" should be --Ramirez-Torres--.

Col. 3, line 34, delete "the" (2nd occurrence).

Signed and Sealed this

Twenty-sixth Day of March 1985

[SEAL]

Attest:

DONALD J. QUIGG

Attesting Officer

Acting Commissioner of Patents and Trademarks